United States Patent
Juhasz

(10) Patent No.: US 9,993,977 B2
(45) Date of Patent: Jun. 12, 2018

(54) SYSTEM FOR USING AN OPTICAL SENSOR ARRAY TO MONITOR COLOR FIDELITY IN OBJECTS PRODUCED BY A THREE-DIMENSIONAL OBJECT PRINTER

(71) Applicant: Xerox Corporation, Norwalk, CT (US)

(72) Inventor: John C. Juhasz, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 419 days.

(21) Appl. No.: 14/872,597

(22) Filed: Oct. 1, 2015

(65) Prior Publication Data

US 2017/0095978 A1 Apr. 6, 2017

(51) Int. Cl.

| | |
|---|---|
| B29C 64/386 | (2017.01) |
| B29C 67/00 | (2017.01) |
| B33Y 50/02 | (2015.01) |
| B29C 64/20 | (2017.01) |
| H04N 1/00 | (2006.01) |
| B29C 64/112 | (2017.01) |
| B29C 64/40 | (2017.01) |
| H04N 1/028 | (2006.01) |
| H04N 1/03 | (2006.01) |
| B29K 105/00 | (2006.01) |
| B33Y 10/00 | (2015.01) |
| B33Y 30/00 | (2015.01) |
| G01B 11/00 | (2006.01) |
| B33Y 50/00 | (2015.01) |

(52) U.S. Cl.
CPC ........ B29C 67/0088 (2013.01); B29C 64/112 (2017.08); B29C 64/20 (2017.08); B29C 64/386 (2017.08); B29C 64/40 (2017.08); B29C 67/0059 (2013.01); B33Y 50/02 (2014.12); H04N 1/00827 (2013.01); H04N 1/02805 (2013.01); H04N 1/02895 (2013.01); H04N 1/03 (2013.01); B29K 2105/0032 (2013.01); B29K 2105/0058 (2013.01); B29K 2995/002 (2013.01); B33Y 10/00 (2014.12); B33Y 30/00 (2014.12); B33Y 50/00 (2014.12); G01B 11/00 (2013.01)

(58) Field of Classification Search
CPC ... H04N 1/00827; B33Y 50/00; B29C 64/386
See application file for complete search history.

(56) References Cited

U.S. PATENT DOCUMENTS

| | | | |
|---|---|---|---|
| 5,917,332 A | 6/1999 | Chen et al. | |
| 6,173,070 B1 | 1/2001 | Michael et al. | |
| 6,377,865 B1 | 4/2002 | Edelsbrunner et al. | |

(Continued)

FOREIGN PATENT DOCUMENTS

EP     2 584 534 A2     4/2013

*Primary Examiner* — Benjamin A Schiffman
(74) *Attorney, Agent, or Firm* — Maginot Moore & Beck LLP

(57) ABSTRACT

A three-dimensional object printer generates image data of an object being formed in the printer with an optical sensor array and identifies the color of an upper surface of the object. The controller compares the identified color to a predetermined range about an expected color for the upper surface and operates ejectors to eject material of a color different than the identified color in response to the identified color being outside of the predetermined range.

10 Claims, 3 Drawing Sheets

(56) References Cited

U.S. PATENT DOCUMENTS

| | | | |
|---|---|---|---|
| 6,763,141 B2* | 7/2004 | Xu | H04N 1/00002 |
| | | | 382/199 |
| 7,047,151 B2 | 5/2006 | Chang | |
| 7,457,455 B2 | 11/2008 | Matsui et al. | |
| 8,368,964 B2* | 2/2013 | Xu | G06T 5/003 |
| | | | 358/3.27 |
| 8,477,154 B2 | 7/2013 | Davis et al. | |
| 8,837,026 B2 | 9/2014 | Fisker et al. | |
| 9,079,440 B1* | 7/2015 | Bonino | B41J 29/393 |
| 9,079,441 B1* | 7/2015 | Giacobbi | B41J 29/393 |
| 9,302,519 B1* | 4/2016 | Clark | B29C 64/112 |
| 9,327,537 B2* | 5/2016 | Conrow | B41J 29/393 |
| 9,352,572 B2* | 5/2016 | Derleth | B41J 2/16579 |
| 9,415,546 B2* | 8/2016 | Conrow | B29C 67/0088 |
| 2007/0268540 A1* | 11/2007 | Gaspardo | G06T 7/579 |
| | | | 359/196.1 |
| 2008/0148803 A1 | 6/2008 | Skultety-Betz et al. | |
| 2010/0157312 A1* | 6/2010 | Van Amstel | G01B 11/24 |
| | | | 356/511 |
| 2011/0205583 A1 | 8/2011 | Young et al. | |
| 2012/0290259 A1 | 11/2012 | McAfee et al. | |
| 2013/0235037 A1 | 9/2013 | Baldwin et al. | |
| 2014/0240700 A1* | 8/2014 | Ogawa | G01N 21/956 |
| | | | 356/244 |
| 2014/0376064 A1* | 12/2014 | Rosberg | G01B 11/2513 |
| | | | 358/475 |
| 2015/0210011 A1* | 7/2015 | Conrow | B29C 67/0088 |
| | | | 264/40.4 |
| 2015/0273857 A1* | 10/2015 | Derleth | B41J 2/16579 |
| | | | 347/19 |
| 2017/0059302 A1* | 3/2017 | Mantell | B33Y 10/00 |
| 2017/0095977 A1* | 4/2017 | Thresh | B29C 67/0088 |

\* cited by examiner

SYSTEM FOR USING AN OPTICAL SENSOR ARRAY TO MONITOR COLOR FIDELITY IN OBJECTS PRODUCED BY A THREE-DIMENSIONAL OBJECT PRINTER

TECHNICAL FIELD

The system and method disclosed in this document relates to printers that produce three-dimensional objects and, more particularly, to the production of colors in the appearance of such objects in these printers.

BACKGROUND

Digital three-dimensional manufacturing, also known as digital additive manufacturing, is a process of making a three-dimensional solid object from a digital model of virtually any shape. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is the production of colors in the surface of the objects. During printing of an object, one or more inkjets ejecting colored material can deteriorate and stop ejecting drops or eject drops that are smaller than an inkjet should eject. These inkjet deficiencies can result in objects with faded colors or objects with colors having a different hue than expected. Once the color defects in such objects are detected, the printed objects are scrapped, restorative procedures are applied to the printheads to restore inkjet functionality, and the print job is repeated.

Another issue that arises in the formation of objects with three-dimensional object printers occurs when one color object is embedded in a larger object of a different color that enables the embedded object to be seen. Color fidelity may be lost or color non-uniformity may occur at the boundaries of the embedded object where a transition occurs between the two objects. Consequently, a printer that detects inaccurately colored objects or the loss of color uniformity at boundaries between two different colors within an object while printing would enable the performance of compensatory procedures during object printing. These compensatory procedures enable the printer to produce properly colored objects and increase the productivity of the printer.

SUMMARY

A printer that uses an optical sensor array to enable evaluation of object color includes a substrate, at least one ejector configured to eject drops of material towards the substrate to form an object on the substrate, an optical sensor array having a light source and a plurality of photo detectors, the optical sensor array being configured to generate data corresponding to light reflected by an upper surface of the object on the substrate, at least one actuator operatively connected to the at least one ejector and the optical sensor array, and a controller operatively connected to the at least one ejector, the optical sensor array, and the at least one actuator, the controller being configured to operate the at least one ejector to eject drops of material onto the substrate to form layers of the object on the substrate, to operate the at least one actuator to move the at least one ejector away from the substrate, to operate the at least one actuator to move the optical sensor array across the object to enable the optical sensor array to generate data of the upper surface of the object, and to identify a color of the upper surface of the object with reference to the data received from the optical sensor array.

A method of operating a printer with an optical sensor array to evaluate object color includes operating with a controller at least one ejector to eject drops of material towards a substrate to form layers of an object on the substrate, operating with the controller at least one actuator to move the at least one ejector away from the substrate, operating with the controller the at least one actuator to move an optical sensor array having a light source and a plurality of photo detectors across the object, generating with the optical sensor array data of an upper surface of the object, and identifying with the controller a color of the object with reference to the data received from the optical sensor array.

BRIEF DESCRIPTION OF THE DRAWINGS

The foregoing aspects and other features of a printer that uses an optical sensor array to evaluate object color during three-dimensional printing are explained in the following description, taken in connection with the accompanying drawings.

DETAILED DESCRIPTION

Figure 1:
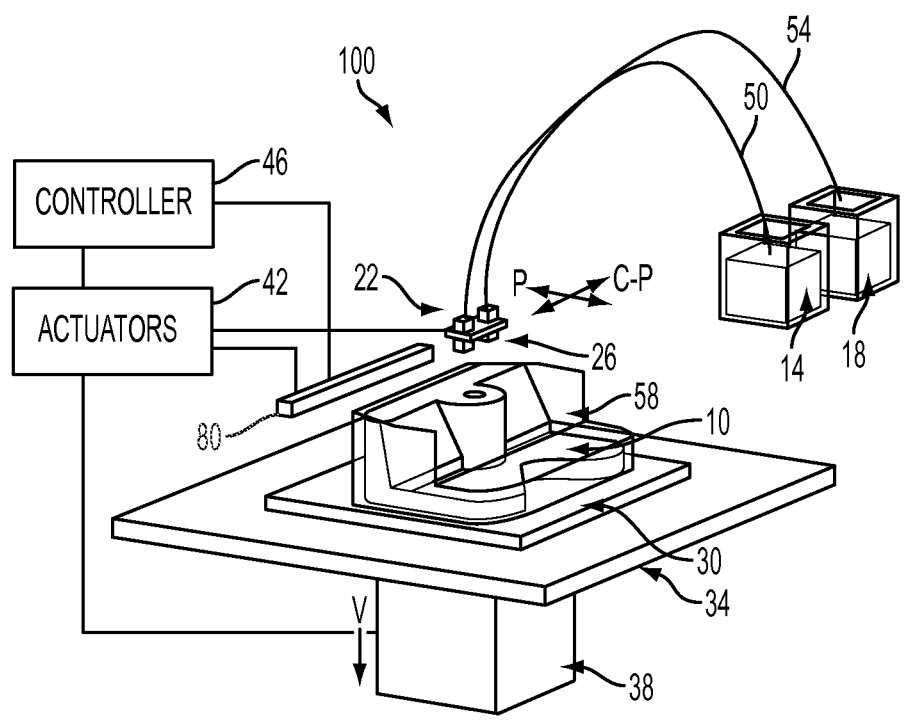
FIG. 1 is a perspective view of a three-dimensional object printer that identifies the color of objects with an optical sensor array.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional object printer" refers to any device that ejects material with reference to image data of an object to form a three-dimensional object. The printer 100 includes a support material reservoir 14, a build material reservoir 18, a pair of printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. The controller 46 operates both printheads with reference to three-dimensional image data in a memory operatively connected to the controller to eject the support and build materials supplied to each respective printhead. The build material forms the structure of the part 10, while the support structure 58 formed by the support material enables the building material to maintain its shape while the material solidifies as the part is being constructed. After the part is finished, the support structure 58 is removed by washing, blowing, or melting. Although printer 100 has been described as having two printheads that eject different types or colors of material, a printer that monitors color uniformity as described below can have a greater number of printheads than two and each printhead can eject a different color or type of material.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. The two printheads 22 and 26 can adjoined in a single structure so the two printheads can move in tandem. Alternatively, the two printheads can be separated so they can be moved independently of one another. In some of these embodiments, each printhead 22 and 26 has a single ejector, while in other of these embodiments, each printhead 22 and 26 has multiple ejectors. Alternatively, one or more actuators are operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction occurs with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

The three-dimensional object printer 100 also includes an optical sensor array 80. The optical sensor array includes one or more light sources and a plurality of photo detectors arranged in a linear array. In one embodiment, the light source is a white light source. The optical sensor array is operatively connected to the actuators 42 to enable the controller 46 to move the sensor array bi-directionally vertically and bi-directionally in the process direction. The ability to move the sensor array vertically enables the optical sensor to generate image data signals of the topmost layer of the object 10 as the object is built by the printer. Because color is produced in an object by ejecting material drops of one or more colors at the upper surface layers of the object, varying the height of the sensor array over the build substrate 30 enables the array to pass closely over the object 10 without contacting the object. The controller 46 receives the signals generated by the optical sensor array, identifies the color of the object, and compares the identified color to the expected color of the layer. The controller can adjust operation of the printer to compensate for differences detected from the comparison.

Figure 3:
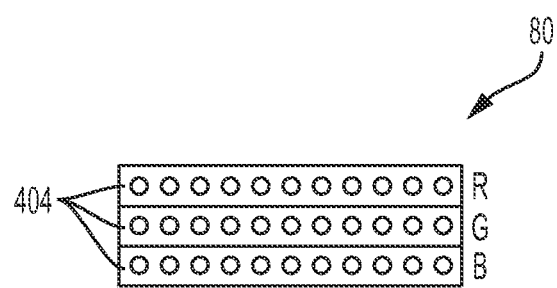
FIG. 3 depicts a structure for the optical sensor shown in FIG. 1.

In more detail, the linear array of photo detectors in an optical sensor array 80 is fabricated as a semiconductor circuit. In one embodiment of the optical sensor array 80 shown in FIG. 3, three linear arrays of photo detectors 404 having a resolution of approximately 400 spi are positioned parallel to one another. Each array of photo detectors in this embodiment are filtered to one of the colors red, green, and blue (RGB). This configuration enables the optical sensor array 80 to provide full-color image data of the object. In embodiments that produce only monochromatic data, the green-filtered array is the only array used. Thus, monochromatic optical sensor arrays can be implemented with a full-color optical sensor array and the signals from the other two color-filtered arrays are ignored, or the monochromatic sensor array can be implemented with a single, green light filtered linear array of photodetectors.

As the sensor array 80 passes in the process direction over the surface of an object 10, the light source of the sensor directs light onto the surface. The surface reflects or scatters the light depending upon the color of the surface that the light hits. One of the photo detectors in the sensor receives the reflected light and generates an electrical signal that is proportional to the amplitude of the light received by the photo detector. A/D circuits convert the electrical signals received from the photo detectors of the sensor 80 into digital values and these digital values are delivered to the controller 46. The controller 46 stores these digital values in a memory operatively connected to the controller. The range of the digital value that can be generated by the photo detector and A/D circuit is mapped to colors. For example, if a photo detector produces a digital value in the range of 0 to 255, the lower numbers correspond to colors that absorb light, with black being the color that absorbs the most light, and the upper numbers correspond to colors that reflect light, such as yellow or blank white paper. Thus, as an example, black could be assigned the range of 0 to 63, cyan the range of 64 to 127, magenta the range of 128 to 191, and yellow 192 to 255. These ranges and corresponding colors can be determined empirically and more or fewer colors than four included in the gamut of colors in the overall range. Thus, each photo detector generally corresponds to drop of material in a single layer, although higher or lower resolution photo detectors can be used in the sensor. By comparing the color corresponding to the digital values generated by the sensor to the color of the drops forming a layer in the data used to operate the ejectors 22 and 26, the controller 46 determines whether the color is within a predetermined range about the expected color. If the color is outside the range, then the controller 46 operates ejectors that eject drops of a different color or shade of color in the next layer to compensate for the color discrepancy.

Figure 2:
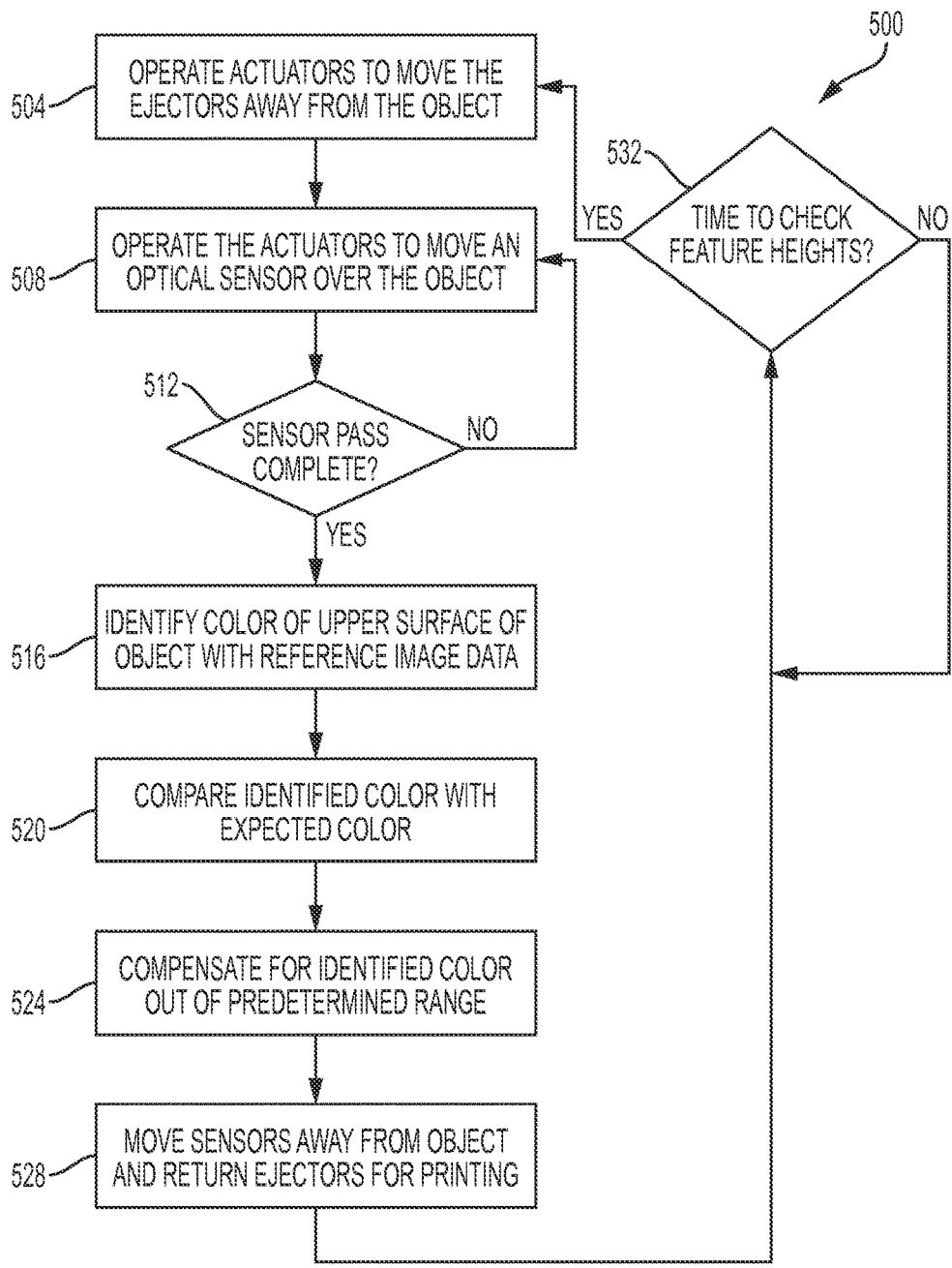
FIG. 2 is a flow diagram of a method for operating the printer with the optical sensor array of FIG. 1 to evaluate color in the object.

A method 500 of operating a printer that produces three-dimensional objects is shown in FIG. 2. In the description of this method, statements that a process is performing some task or function refers to a controller or general purpose processor executing programmed instructions stored in a memory operatively connected to the controller or processor to manipulate data or to operate one or more components in the printer to perform the task or function. The controller 46 noted above can be such a controller or processor. Alternatively, the controller 46 can be implemented with more than one processor and associated circuitry and components, each of which is configured to form one or more tasks or functions described herein.

At predetermined times in the printing operation, the controller 46 (FIG. 1) operates actuators 42 to move the ejectors 22, 26 from the plane above the object 10 so the sensor array 80 can pass over the object (block 504). The controller then operates the actuators 42 to move the sensor 80 over the object while the light source in the sensor directs light onto the upper surface of the object and the photo detectors of the sensor generate image data of the upper surface of the object (block 508). Once the sensor has completed the pass (block 512), the controller identifies the color of the drops in the upper surface of the object (block 516) and compares this color to the expected color of the drops in the surface (block 520). Any color difference outside of a predetermined range is used to operate ejectors ejecting different colored material to compensate for the discrepancy (block 524). Then, the controller 46 moves the sensor 80 away from the object 10 and the ejectors 22, 26 are returned to positions above the object to further manufacture the object (block 528). The process of FIG. 5 is performed from time to time (block 532) during the manufacture of the object until the manufacture of the object is completed.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
    a substrate;
    at least one ejector configured to eject drops of material towards the substrate to form an object on the substrate;
    an optical sensor array having a light source and a plurality of photo detectors, the optical sensor array being configured to generate data corresponding to light reflected by an upper surface of the object on the substrate;
    at least one actuator operatively connected to the at least one ejector and the optical sensor array; and
    a controller operatively connected to the at least one ejector, the optical sensor array, and the at least one actuator, the controller being configured to operate the at least one ejector to eject drops of material onto the substrate to form layers of the object on the substrate, to operate the at least one actuator to move the at least one ejector away from the substrate, to operate the at least one actuator to move the optical sensor array across the object to enable the optical sensor array to generate data of the upper surface of the object, and to identify a color of the upper surface of the object with reference to the data received from the optical sensor array.

2. The printer of claim 1, the controller being further configured to operate the at least one actuator to move the optical sensor array across a width of the substrate.

3. The printer of claim 2, the controller being further configured to move the optical sensor array across the width of the substrate bi-directionally.

4. The printer of claim 1, the controller being further configured to:
    compare the identified color to a predetermined range about a color corresponding to data used by the controller to operate the at least one ejector; and
    operate at least one other ejector to eject drops of a material having a color different than a color of the drops of material ejected by the at least one ejector in response to the color of the object being outside of the predetermined range.

5. The printer of claim 1, the light source of the optical sensor array further comprising:
    a source of white light oriented to illuminate a field of view of the photo detectors of the optical sensor array.

6. The printer of claim 1, the optical sensor array further comprising:
    at least two linear arrays of photo detectors positioned parallel to one another.

7. The printer of claim 6, the optical sensor array further comprising:
    three linear arrays of photo detectors positioned parallel to one another.

8. The printer of claim 7, the three linear arrays further comprising:
    a filter for filtering green light for one of the three linear arrays;
    a filter for filtering red light for another one of the three linear arrays that is different than the one having the filter for filtering green light; and
    a filter for filtering blue light for one of the three linear arrays that different than the linear array having the filter for filtering green light and the linear array having the filter for filtering red light.

9. The printer of claim 1, the optical sensor array being further configured to be one of a chromatic optical sensor and a monochromatic optical sensor.

10. The printer of claim 1, the optical sensor array being further comprising:
    a single linear array of photo detectors having a filter for filtering green light.

* * * * *